US012392146B2

(12) United States Patent
Simon Gonzalez et al.

(10) Patent No.: US 12,392,146 B2
(45) Date of Patent: Aug. 19, 2025

(54) WORK SURFACE FOR A VEHICLE

(71) Applicant: Ford Global Technologies, LLC, Dearborn, MI (US)

(72) Inventors: Jose Ernesto Simon Gonzalez, Culiacan (MX); Jose Maria Aburto, Oaxtepec (MX); Lorena Virginia Mendez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 562 days.

(21) Appl. No.: 17/948,543

(22) Filed: Sep. 20, 2022

(65) Prior Publication Data

US 2024/0093515 A1 Mar. 21, 2024

(51) Int. Cl.
*E04G 1/32* (2006.01)
*E04G 7/30* (2006.01)

(52) U.S. Cl.
CPC .............. *E04G 1/32* (2013.01); *E04G 7/301* (2013.01)

(58) Field of Classification Search
CPC .................................. E04G 1/32; E04G 7/301
See application file for complete search history.

(56) References Cited

U.S. PATENT DOCUMENTS

| | | | |
|---|---|---|---|
| 5,136,953 A | 8/1992 | Schmidt | |
| 5,533,771 A * | 7/1996 | Taylor | B60P 1/435 296/61 |
| 5,595,417 A * | 1/1997 | Thoman | B60J 7/102 292/213 |
| 5,820,190 A * | 10/1998 | Benner | B60P 3/14 296/26.09 |
| 7,240,939 B2 * | 7/2007 | Vandekerkhof | B60P 3/40 296/26.1 |
| 7,377,525 B1 | 5/2008 | Whitmore | |
| 7,389,738 B1 * | 6/2008 | Walczykowski | B63B 29/04 114/363 |
| 9,615,654 B2 * | 4/2017 | Grace | A47B 3/087 |
| 9,783,246 B1 | 10/2017 | Long et al. | |
| 9,914,384 B2 | 3/2018 | Yilma et al. | |
| 10,532,683 B1 * | 1/2020 | Bowman | B60P 1/003 |
| 11,142,129 B2 * | 10/2021 | Howard, II | B60R 5/02 |
| 11,191,350 B2 * | 12/2021 | Bugg | A47B 1/10 |

(Continued)

FOREIGN PATENT DOCUMENTS

CN  208524056 U  *  2/2019

*Primary Examiner* — Justin M Benedik
(74) *Attorney, Agent, or Firm* — Vichit Chea; Price Heneveld LLP

(57) ABSTRACT

A work surface for a vehicle includes a first section, a central section, and a first lock assembly. The first section includes a proximal edge and a distal edge. The first section defines a channel therein. The central section includes a first end and a second end. The first end of the central section is positioned adjacent to the proximal edge of the first section. The proximal edge of the first section is pivotably coupled to the first end of the central section. The first section is movable between a stowed position and a fully-deployed position relative to the central section. The first lock assembly is coupled to the central section. The first lock assembly includes a post that is operable between a retracted position and an extended position. The fully-deployed position of the first section arranges the channel defined by the first section to receive the post.

16 Claims, 11 Drawing Sheets

(56) References Cited

U.S. PATENT DOCUMENTS

| | | | |
|---|---|---|---|
| 2002/0096845 A1* | 7/2002 | Spann | A61G 12/001 |
| | | | 280/79.2 |
| 2002/0153736 A1* | 10/2002 | Goodyear | B60R 5/04 |
| | | | 296/26.01 |
| 2003/0168876 A1 | 9/2003 | Kiester et al. | |
| 2005/0036849 A1 | 2/2005 | Kiester et al. | |
| 2006/0061116 A1 | 3/2006 | Haaberg | |
| 2013/0269574 A1* | 10/2013 | Cooper | A47B 3/0815 |
| | | | 108/69 |
| 2018/0312099 A1* | 11/2018 | Loew | E05D 3/125 |
| 2021/0206323 A1 | 7/2021 | Carbone | |
| 2022/0282501 A1* | 9/2022 | Chen | E06C 1/393 |
| 2023/0139449 A1* | 5/2023 | Pozgay | E06C 1/39 |
| | | | 182/20 |

* cited by examiner

WORK SURFACE FOR A VEHICLE

FIELD OF THE DISCLOSURE

The present disclosure generally relates to a work surface. More specifically, the present disclosure relates to a work surface for a vehicle.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a work surface for a vehicle includes a first section, a central section, and a first lock assembly. The first section includes a proximal edge and a distal edge. The first section defines a channel therein. The central section includes a first end and a second end. The first end of the central section is positioned adjacent to the proximal edge of the first section. The proximal edge of the first section is pivotably coupled to the first end of the central section. The first section is movable between a stowed position and a full-deployed position relative to the central section. The first lock assembly is coupled to the central section. The first lock assembly includes a post that is operable between a retracted position and an extended position. The fully-deployed position of the first section arranges the channel defined by the first section to receive the post of the first lock assembly.

Embodiments of the first aspect of the disclosure can include any one or a combination of the following features:
- a fully-deployed-and-locked position of the first section is defined as the post of the first lock assembly extending into the channel defined by the first section when the first section is in the fully-deployed position;
- a second section having a proximal edge and a distal edge, wherein the proximal edge of the second section is positioned adjacent to the second end of the central section;
- the central section is positioned between the first section and the second section;
- the second section is pivotably coupled to the second end of the central section;
- the second section is movable between a stowed position and a fully-deployed position relative to the central section;
- the second section defines a channel therein;
- a second lock assembly is coupled to the central section, wherein the second lock assembly includes a post that is operable between a retracted position and an extended position, and wherein the fully-deployed position of the second section arranges the channel defined by the second section to receive the post of the second lock assembly;
- a fully-deployed-and-locked position of the second section is defined as the post of the second lock assembly extending into the channel defined by the second section when the second section is in the fully-deployed position;
- the first section and the second section are capable of use as support legs for the central section when the first section and the second section are each in a partially-deployed position;
- a second lock assembly coupled to the central section, wherein the second lock assembly includes a post that is operable between a retracted position and an extended position, and wherein placing the post of the first lock assembly in the extended position when the first section is in the partially-deployed position and placing the post of the second lock assembly in the extended position when the second section is in the partially-deployed position aids in retaining the first section and the second section in the partially-deployed position;
- a recess defined in an underside of the work surface;
- a leg that is received by the recess, wherein the leg is configured to provide support to the work surface;
- the first locking assembly further includes a biasing member positioned between the post and the central section, wherein the biasing member biases the post to the extended position;
- the first lock assembly further includes a protrusion that extends from the post; and
- a first receptacle defined by the central section, wherein the protrusion is configured to engage with the first receptacle when the post is in the retracted position, and wherein the engagement between the protrusion and the first receptacle retains the post in the retracted position, and a second receptacle defined by the central section, wherein the protrusion is configured to engage with the second receptacle when the post is in the extended position, and wherein the engagement between the protrusion and the second receptacle retains the post in the extended position.

According to a second aspect of the present disclosure, a work surface for a vehicle includes a first section, a second section, a central section, a first lock assembly, and a second lock assembly. The first section includes a proximal edge and a distal edge. The first section defines a channel therein. The second section includes a proximal edge and a distal edge. The second section defines a channel therein. The central section includes a first end and a second end. The central section is positioned between the first section and the second section. The first end of the central section is positioned adjacent to the proximal edge of the first section. The proximal edge of the first section is pivotably coupled to the first end of the central section. The first section is movable between a stowed position and a fully-deployed position relative to the central section. The proximal edge of the second section is positioned adjacent to the second end of the central section. The second section is movable between a stowed position and a fully-deployed position relative to the central section. The first lock assembly is coupled to the central section. The first lock assembly includes a post that is operable between a retracted position and an extended position. The fully-deployed position of the first section arranges the channel defined by the first section to receive the post of the first lock assembly. The second lock assembly is coupled to the central section. The second lock assembly includes a post that is operable between a retracted position and an extended position. The fully-deployed position of the second section arranges the channel defined by the second section to receive the post of the second lock assembly.

Embodiments of the second aspect of the present disclosure can include any one or a combination of the following features:
- a fully-deployed-and-locked position of the first section is defined as the post of the first lock assembly extending into the channel defined by the first section when the first section is in the fully-deployed position, and wherein a fully-deployed-and-locked position of the second section is defined as the post of the second lock assembly extending into the channel defined by the second section when the second section is in the fully-deployed position;

a recess defined in an underside of the work surface, wherein a leg is received by the recess, and wherein the leg is configured to provide support to the work surface; and the first and second locking assemblies each further include, a biasing member positioned between the post and the central section, a protrusion that extends from the post, a first receptacle defined by the central section, and a second receptacle defined by the central section, wherein the biasing member biases the post to the extended position, wherein the protrusion is configured to engage with the first receptacle when the post is in the retracted position, wherein the engagement between the protrusion and the first receptacle retains the post in the retracted position, wherein the protrusion is configured to engage with the second receptacle when the post is in the extended position, and wherein the engagement between the protrusion and the second receptacle retains the post in the extended position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
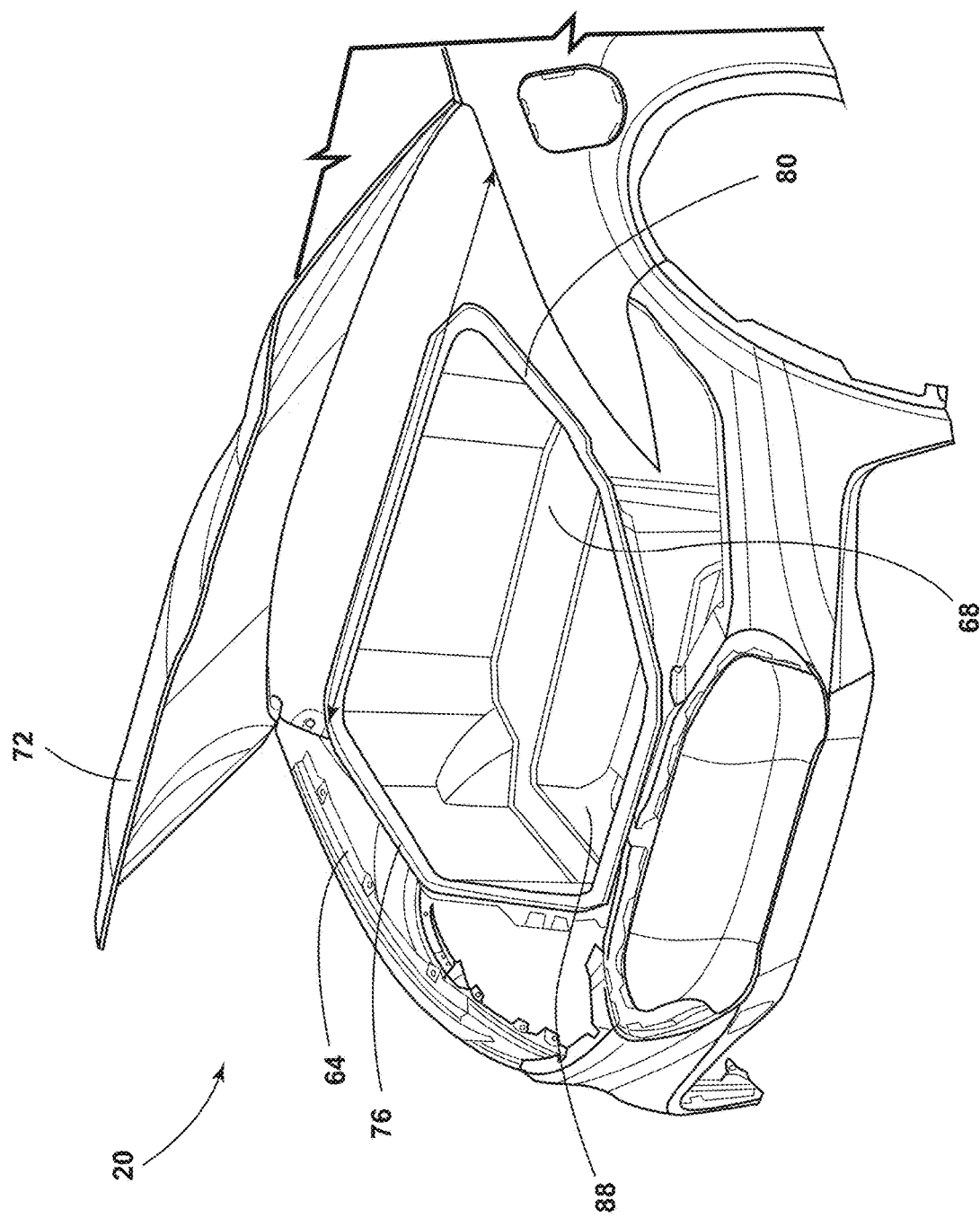
FIG. 1 is a front perspective view of a vehicle, illustrating an access panel in an open position to reveal a cargo area, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a work surface. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-12, reference numeral 20 generally designates a vehicle. The vehicle 20 is provided with a work surface 24. The work surface 24 includes a first section 28 having a proximal edge 32 and a distal edge 36. The first section 28 defines a channel 40 therein. A central section 44 of the work surface 24 includes a first end 48 and a second end 52. The first end 48 of the central section 44 is positioned adjacent to the proximal edge 32 of the first section 28. The proximal edge 32 of the first section 28 is pivotably coupled to the first end 48 of the central section 44. The first section 28 is movable between a stowed position (e.g., see FIG. 7B) and a fully-deployed position (e.g., see FIG. 7C) relative to the central section 44. A first lock assembly 56 is coupled to the central section 44. The first lock assembly 56 includes a post 60 that is operable between a retracted position (e.g., see FIG. 8) and an extended position (e.g., see FIG. 10). The fully-deployed position of the first section 28 can arrange the channel 40 defined by the first section 28 to receive the post 60 of the first lock assembly 56.

Referring again to FIGS. 1-12, the vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many, or all, commuting independent of user interaction while the user maintains override control of the vehicle 20.

Figure 2:
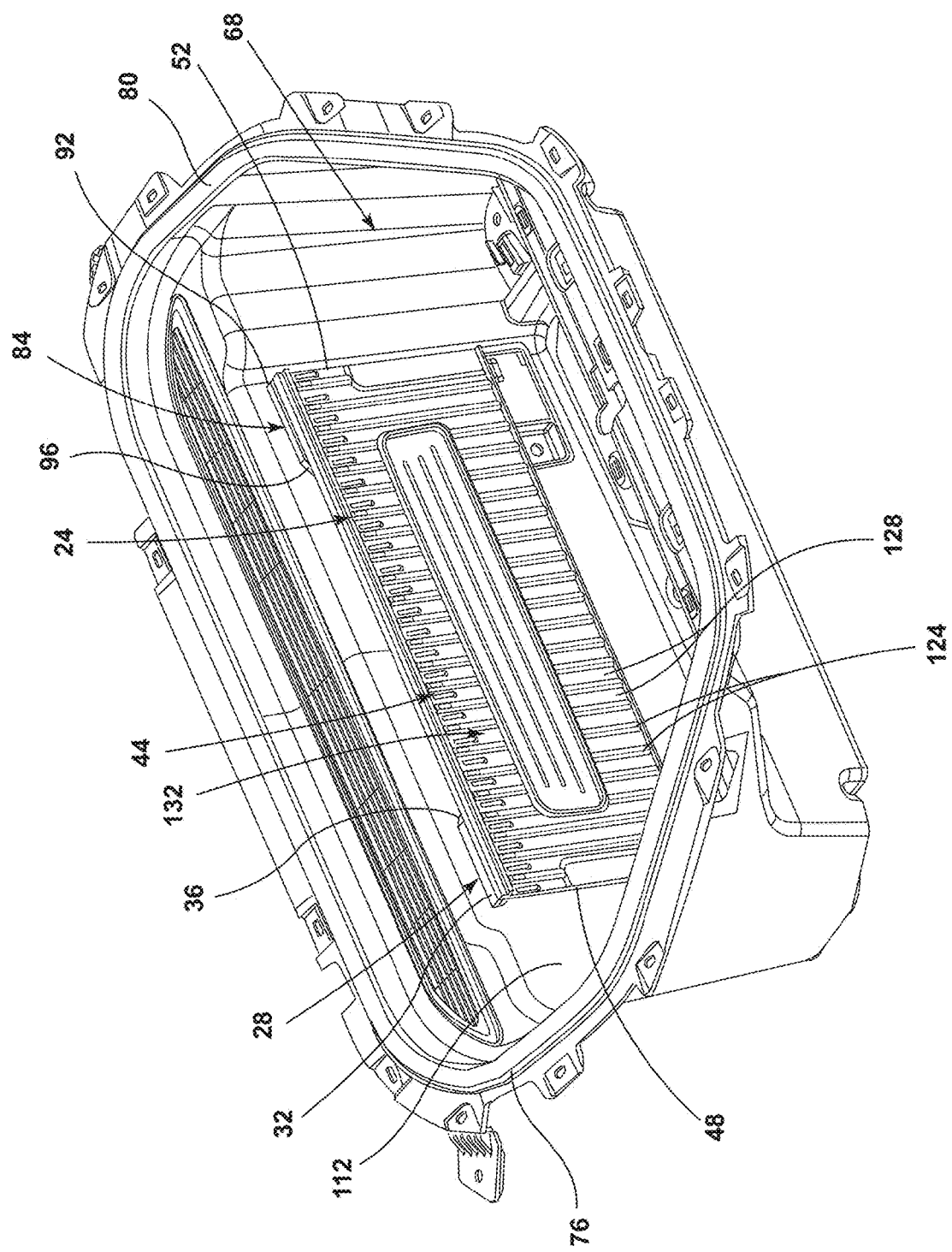
FIG. 2 is a front perspective of the cargo area, illustrating a work surface stored therein, according to one example.
Figure 3:
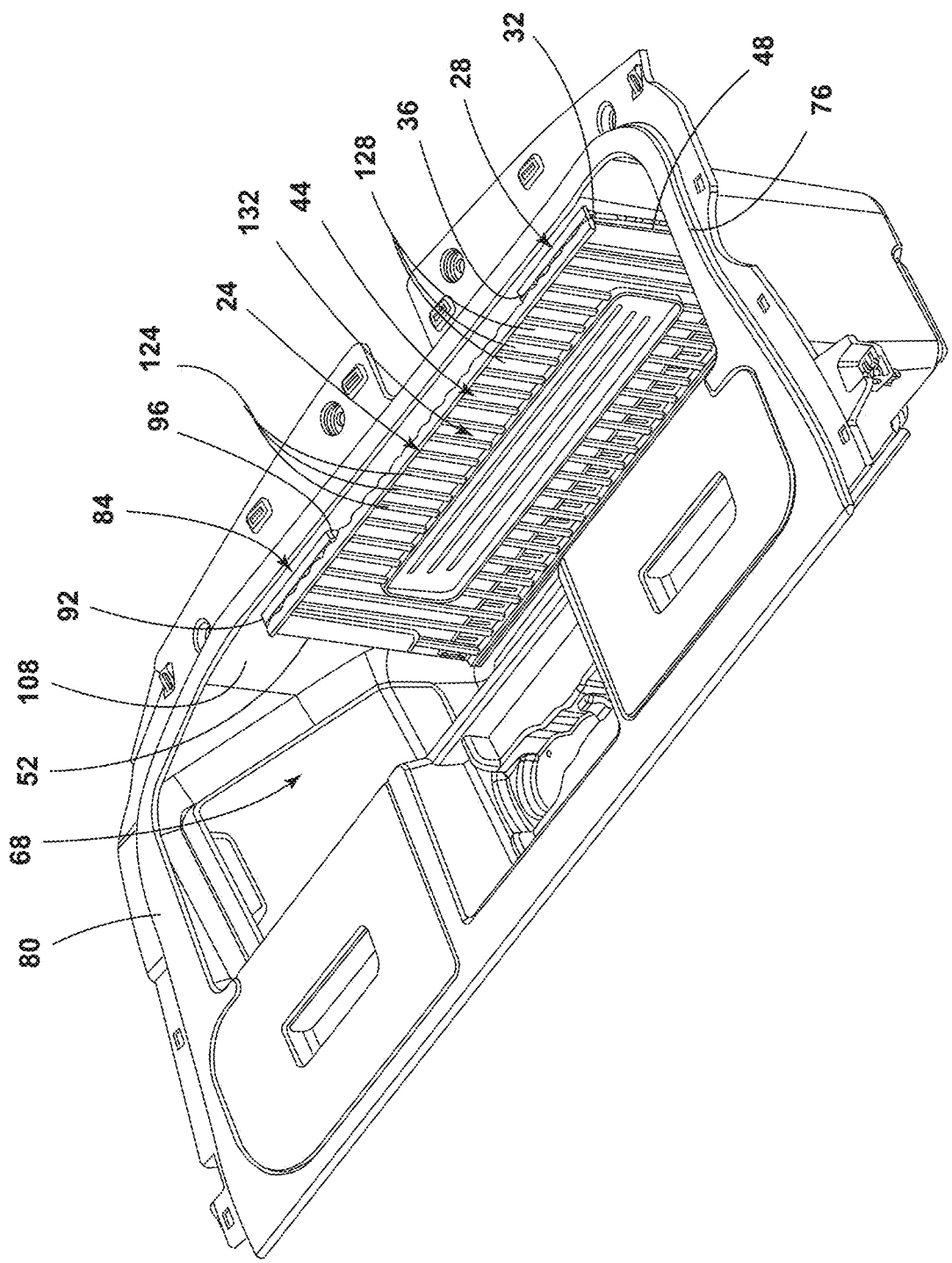
FIG. 3 is a rear perspective view of the cargo area, illustrating the work surface stored therein, according to another example.

Referring now to FIGS. 1-3, the vehicle 20 includes a body 64 that defines a cargo area 68. The cargo area 68 may be selectively accessed by moving an access panel 72 from a closed position to an open position (see FIG. 1). In the example depicted in FIG. 1, the cargo area 68 may be referred to as a front trunk and the access panel 72 may be a hood of the vehicle 20. However, the present disclosure is not so limited. Rather, the cargo area 68 may be positioned at any suitable location on the vehicle 20. In various examples, the work surface 24 may be sized and/or configured to extend from a first side 76 of the cargo area 68 to a second side 80 of the cargo area 68. For example, the first section 28 may engage with the first side 76 of the cargo area 68 and a second section 84 of the work surface 24 may engage with the second side 80 of the cargo area 68 such that the work surface 24 is capable of being suspended above the cargo area 68. In such an example, at least a portion of the cargo area 68 may remain accessible to a user while the work surface 24 is suspended above the cargo area 68. For example, a front 88 of the cargo area 68 may remain accessible to the user while the work surface 24 is suspended above the cargo area 68. The second section 84 of the work surface 24 can be arranged and/or configured in a similar manner to the first section 28. For example, the second section 84 may be a mirror image of the first section 28.

Figure 4:
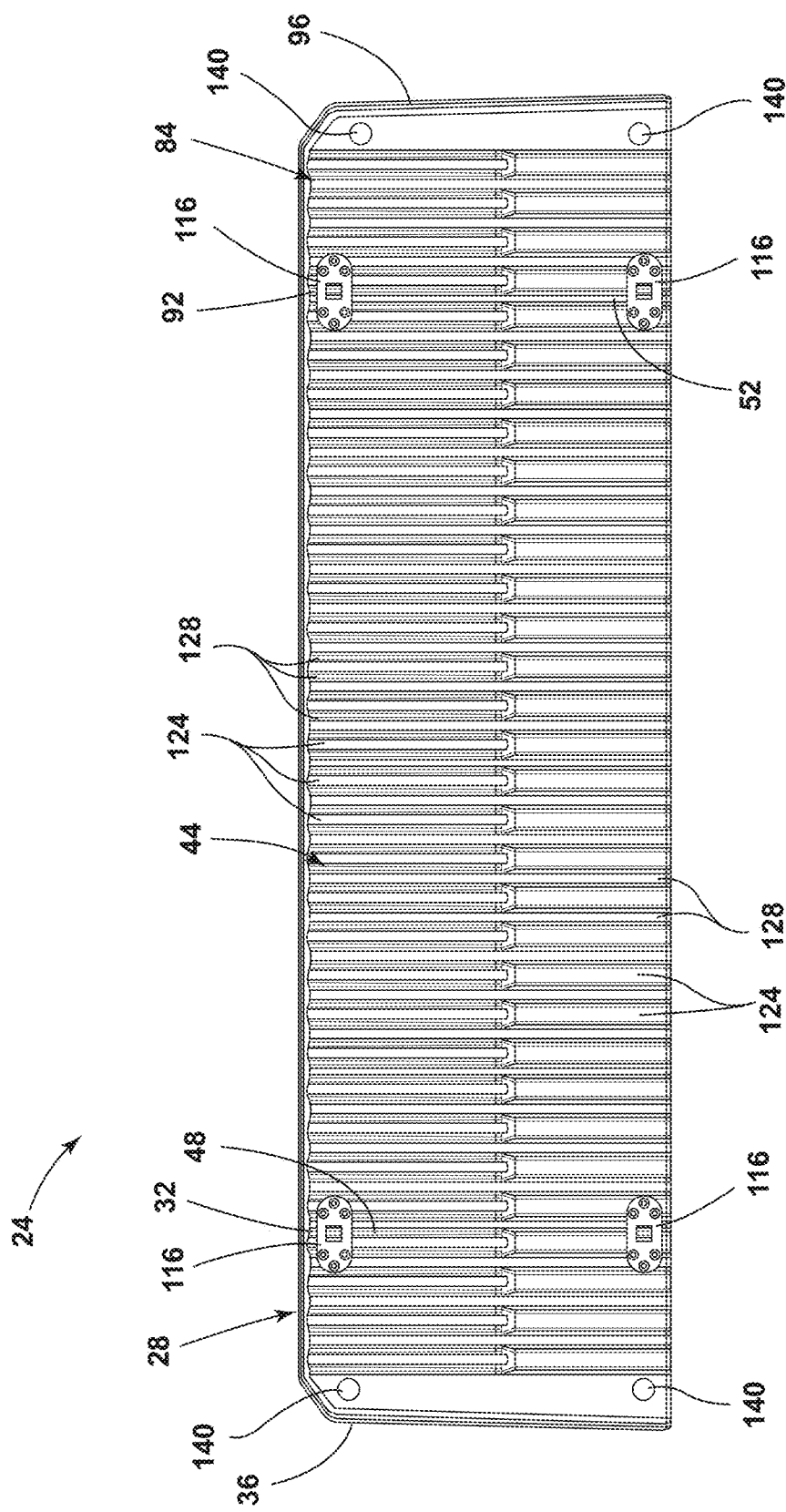
FIG. 4 is bottom view of the work surface, illustrating first and second sections in fully-deployed positions relative to a central section, according to one example.

Referring to FIGS. 2-4, the second section 84 of the work surface 24, when provided, includes a proximal edge 92 and a distal edge 96. In such examples, the proximal edge 92 of the second section 84 is positioned adjacent to the second end 52 of the central section 44. In various examples, the second section 84 can be pivotably coupled to the second end 52 of the central section 44. The central section 44 can be positioned between the first section 28 and the second section 84. As with the first section 28, the second section 84 is movable between a stowed position (e.g., see FIG. 7D) and a fully-deployed position (e.g., see FIG. 7B) relative to the central section 44. In some examples, the second section 84 may be configured and/or arranged in the same manner as the first section 28. Accordingly, the second section 84 can define a channel 100 and the central section 44 can be provided with a second lock assembly 104 coupled thereto, as will be discussed in further detail herein (see FIG. 10).

Referring again to FIGS. 2-4, the work surface 24 can be folded up and stowed within the cargo area 68 of the vehicle 20. Such stowage of the work surface 24 can be provided at a front wall 108 or a rear wall 112 of the cargo area 68. In some examples, a mounting structure may be provided on one of the walls of the cargo area 68 (e.g., the front wall 108, the rear wall 112, or a sidewall). The mounting structure may retain the work surface 24 in the stowed position while the vehicle 20 is in motion and/or may retain the work surface 24 in the stowed position to increase a cargo volume of the cargo area 68 when compared to the work surface 24 being loose in the cargo area 68. The moveable coupling between the first section 28 and the central section 44 can be accomplished by one or more hinges 116 positioned at a junction between the proximal edge 32 of the first section 28 and the first end 48 of the central section 44. Similarly, when employed, the movable coupling between the second section 84 and the central section 44 can be accomplished by one or more of the hinges 116 being positioned at a junction between the proximal edge 92 of the second section 84 and the second end 52 of the central section 44. The hinge(s) 116 may be a living hinge that is defined by a decreased thickness of material of the work surface 24 or may be a multi-part hinge (e.g., including a first member and a second member rotatably coupled to one another by one or more pins). The hinge(s) 116 can be coupled to an underside 120 of the work surface 24.

Referring to FIGS. 4-7D, the underside 120 of the work surface 24 can define a series of ridges 124 and a series of valleys 128. In such an example, each adjacent ridge 124 is separated by one of the valleys 128. In various examples, the series of ridges 124 and the series of valleys 128 may also be defined by a top side 132 of the work surface 24 (see FIGS. 2 and 3). In some examples, the series of ridges 124 defined by the underside 120 of the work surface 24 and the top side 132 of the work surface 24 may correspond with one another such that an alternating pattern of the ridges 124 and the valleys 128 is aligned between the underside 120 and the top side 132. It is contemplated that the ridges 124 and the valleys 128, when provided on the underside 120 and the top side 132, may be arranged in a pattern that results in the ridges 124 of the underside 120 corresponding with the valleys 128 of the top side 132 and vice versa. Such an arrangement may be referred to as a corrugated arrangement. In some examples, the top side 132 of the work surface 24 may be provided with one or more planar areas 136, as will be discussed further herein.

Figure 6:
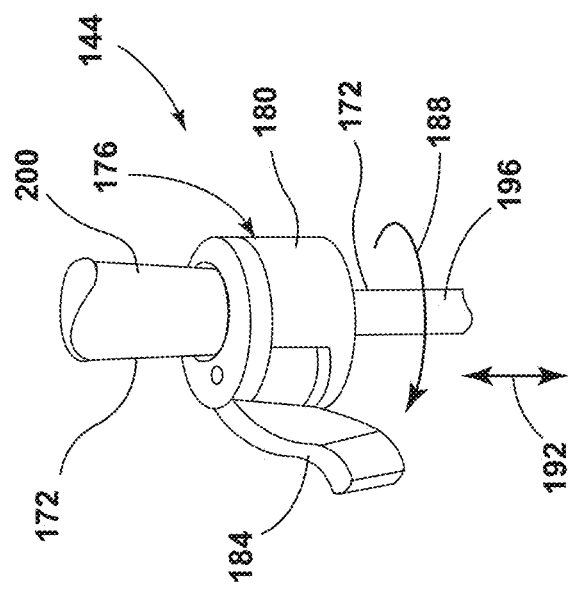
FIG. 6 is a front view of the leg, illustrating a retention assembly thereof, according to one example.
Figure 5:
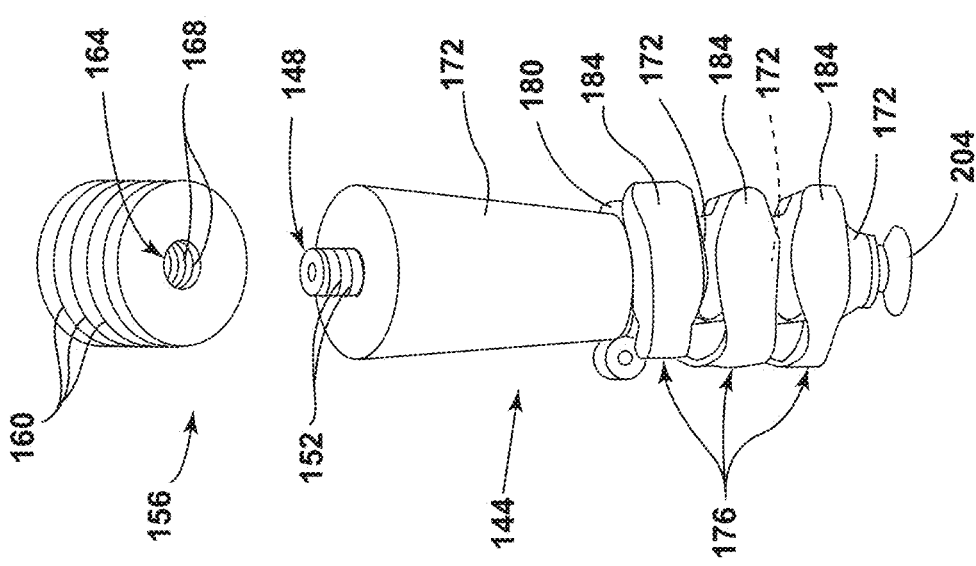
FIG. 5 is a front view of a leg that can be coupled to the work surface, illustrating various components thereof, according to one example.

With specific references to FIGS. 4-6, one or more recesses 140 can be defined in the underside 120 of the work surface 24. In the depicted example of FIG. 4, the recesses 140 are defined in the underside 120 at the first and second sections 28, 84. However, it is contemplated that the one or more of the recesses 140 may additionally, or alternatively, be defined in the underside 120 at the central section 44. Each of the recesses 140 is configured to receive a leg 144. Each leg 144 is configured to provide support to the work surface 24. For example, each of the recesses 140 may receive one of the legs 144 when the work surface 24 is in the fully-deployed position to enable use of the work surface 24 in environments outside of, or immediately adjacent to, the vehicle 20. For example, the work surface 24 may be placed in the fully-deployed position and the legs 144 may be inserted into the recesses 140 such that the work surface 24 can be employed as a table in camping environments, at sporting events, at job sites, and so on. The cargo area 68 may be provided with a designated area for storing the leg(s) 144. In some examples, the leg(s) 144 may be received and/or retained in the underside 120 of the central section 44. In one specific, non-limiting, example, at least some of the valleys 128 may be configured to receive the leg(s) 144.

Referring again to FIGS. 4-6, each of the legs 144 may be received within one of the recesses 140 in a snap fit manner or interference fit manner such that the leg 144 is retained within the recess 140 by a slight deformation of the recess 140 and/or by a weight of the work surface 24. In some examples, the leg 144 may be provided with a threaded portion 148. The threaded portion 148 may have an outer diameter that is less than an outer diameter of a portion of the leg 144 from which the threaded portion 148 extends. The outer diameter of the threaded portion 148 defines threads 152 therein. In examples where the outer diameter of the threaded portion 148 is less than the outer diameter of the portion of the leg 144 from which the threaded portion 148 extends, an insert 156 may be received within the recess 140.

In such an example, the insert 156 may define ribs 160 in an exterior surface thereof that aid in retention of the insert 156 within the recess 140. When the insert 156 is employed, the insert 156 defines a chamber 164 that is provided with threads 168 that are complementary to the threads 152 on the threaded portion 148. In various examples, the insert 156 may be omitted and the recesses 140 can be provided with the threads 168 that are complementary to the threads 152 of the threaded portion 148. In such an example, the recess 140 can be sized to receive the threaded portion 148. In some examples, the threaded portion 148 may be provided directly in the exterior surface of the leg 144 such that the threaded portion 148 does not have an outer diameter that is less than the outer diameter of the portion of the leg 144 from which the threaded portion 148 extends.

Referring further to FIGS. 4-6, the leg 144 may be provided with a plurality of segments 172. Each of the plurality of segments 172 may be telescopically engaged, or extendably engaged, with immediately adjacent others of the plurality of segments 172 such that an overall length of the legs 144 may be adjustable. Adjacent ones of the plurality of segments 172 can be coupled by a retention assembly 176. The retention assembly 176 includes a body 180 and an arm 184. The arm 184 is movable relative to the body 180 between an open position (see FIG. 6) and a closed position (see FIG. 5), as indicated by arrow 188. When the arm 184 is in the open position, a relative position of adjacent segments 172 of the leg 144 is capable of adjustment, as indicated by arrow 192. For example, a lower segment 196 may be adjustable relative to an upper segment 200 when the arm 184 is in the open position (see FIG. 6). In various examples, the leg 144 may be provided with a foot 204 that is positioned at an end of the leg 144 that is opposite from the portion of the leg 144 that engages with the recess 140 (e.g., the threaded portion 148).

Figure 7A:
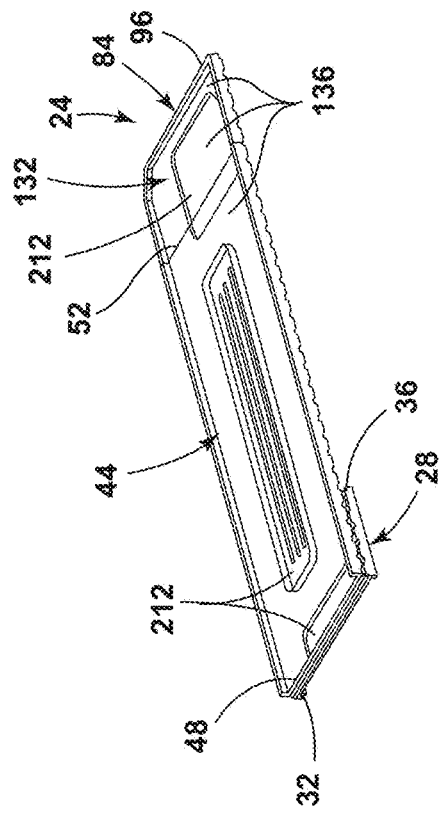
FIG. 7A is a side perspective view of the work surface, illustrating the first section in a partially-deployed position and the second section in a fully-deployed position, according to one example.
Figure 7B:
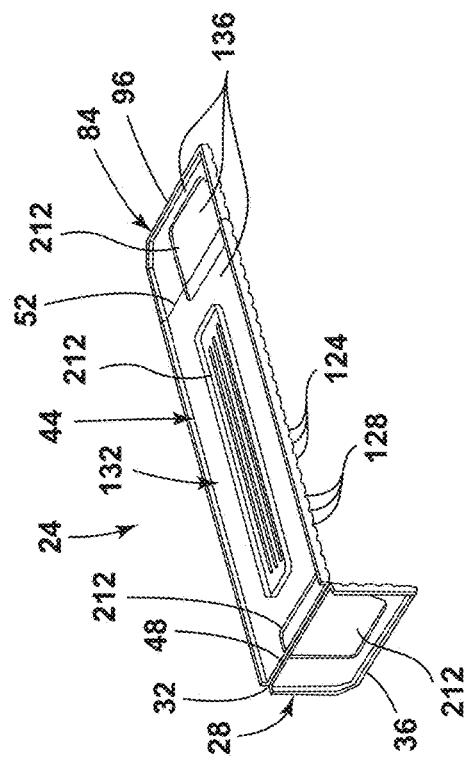
FIG. 7B is a side perspective view of the work surface, illustrating the first section in a stowed position and the second section in the fully-deployed position, according to one example.
Figure 7C:
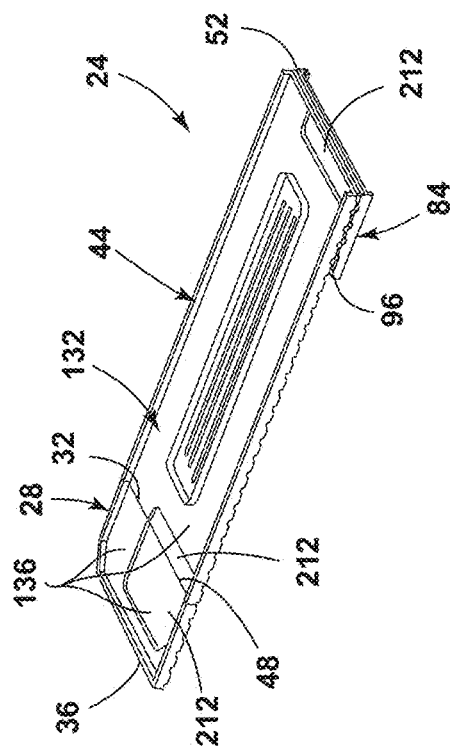
FIG. 7C is a side perspective view of the work surface, illustrating the first section in a fully-deployed position and the second section in a partially-deployed position, according to one example.
Figure 7D:
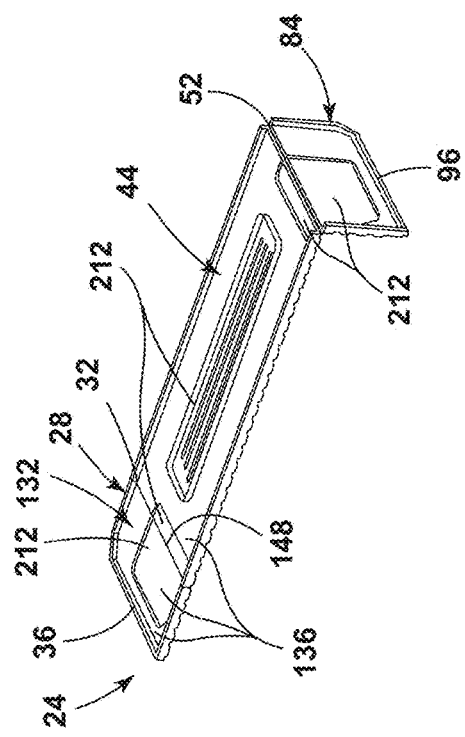
FIG. 7D is a side perspective view of the work surface, illustrating the first section in the fully-deployed position and the second section in a stowed position, according to one example.
Figure 8:
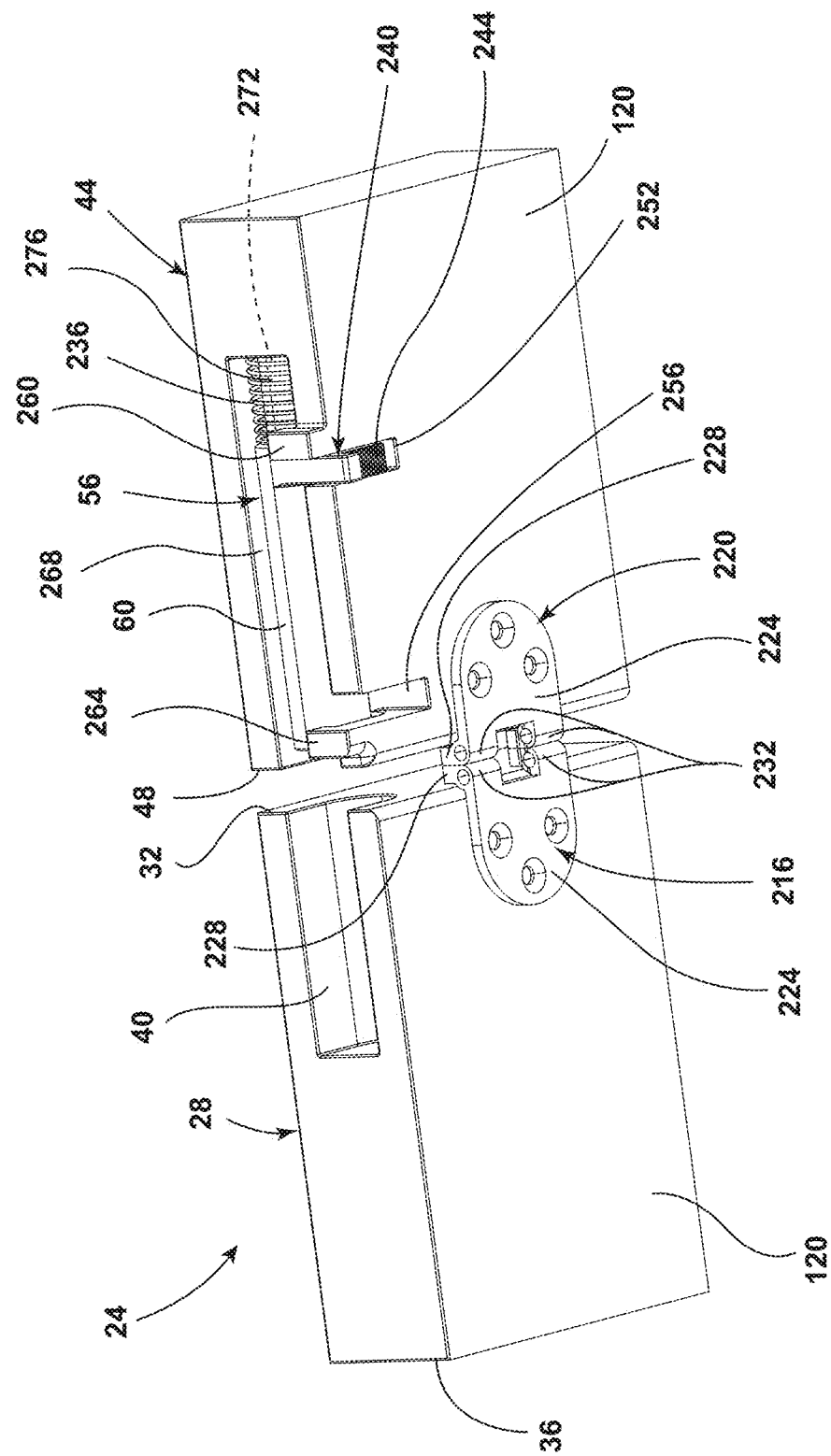
FIG. 8 is a bottom perspective view of an underside of the work surface at a junction between the first section and the central section, illustrating a post in a retracted position, according to one example.
Figure 9:
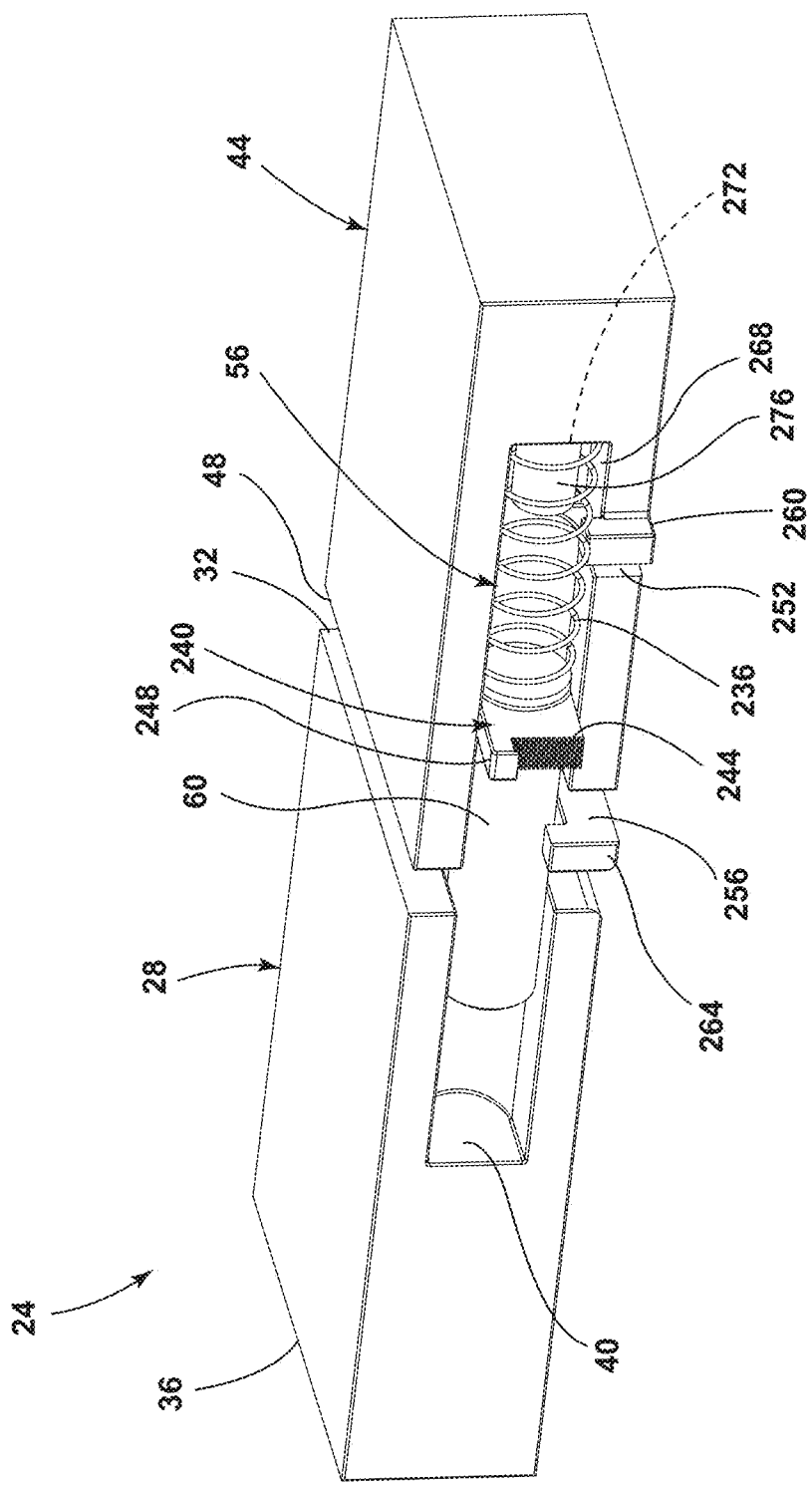
FIG. 9 is a side perspective view of the junction between the first section and the central section, illustrating the post in a partially-extended position, according to one example.
Figure 10:
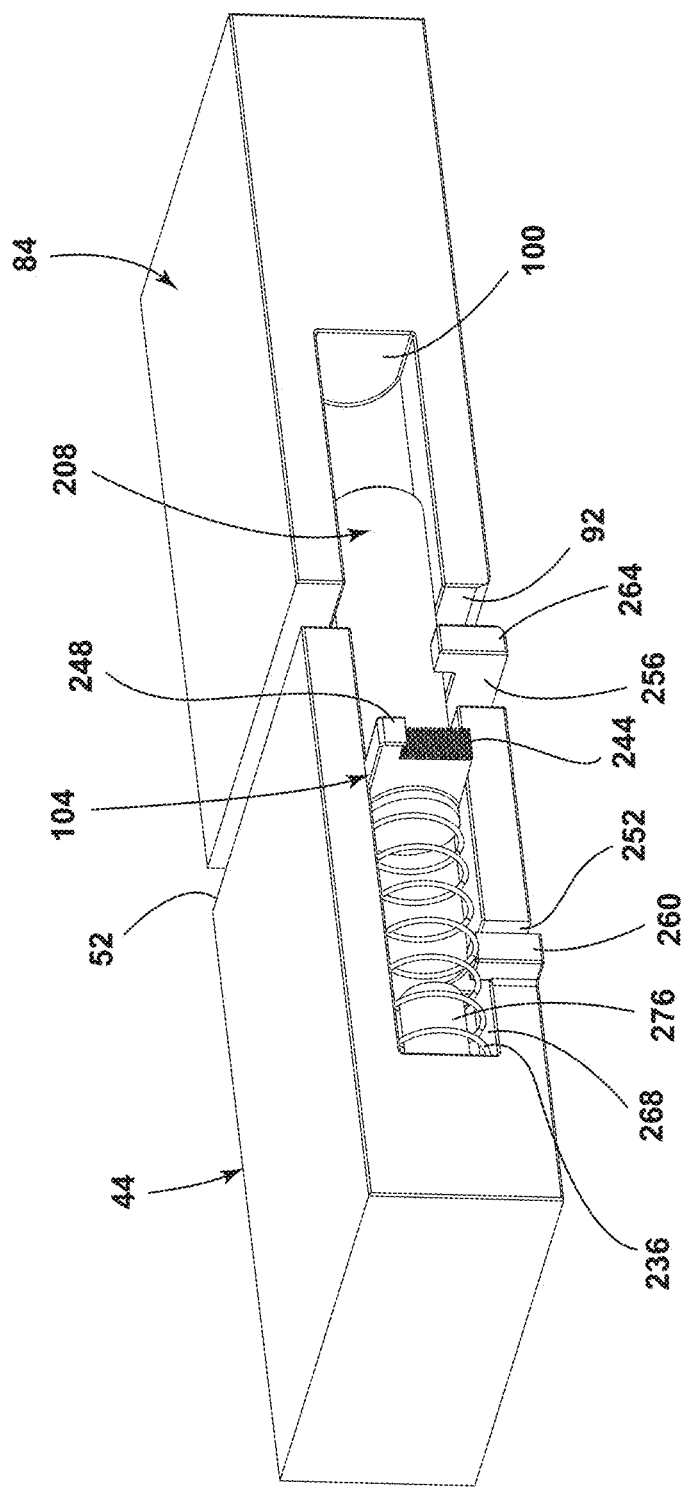
FIG. 10 is a side perspective view of a junction between the second section and the central section, illustrating a post in a partially-extended position, according to one example.
Figure 11:
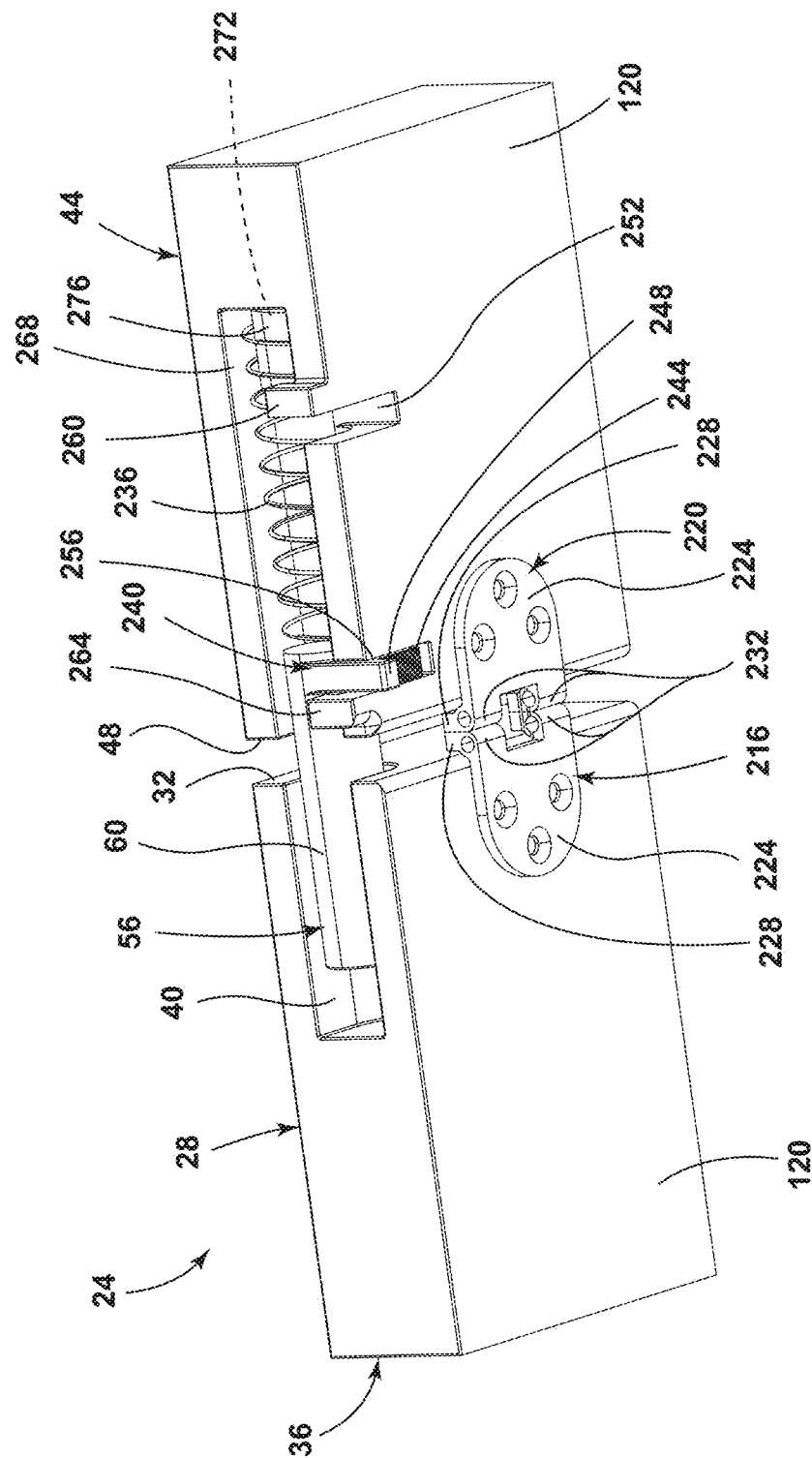
FIG. 11 is a bottom perspective view of the junction between the first section and the central section, illustrating the post in an extended position, according to one example.

Referring now to FIGS. 7A-7D, the work surface 24 is shown in various arrangements with regard to the positioning of the first section 28 and the second section 84. FIGS. 7A and 7D show the first section 28 and the second section 84 in a partially-deployed position relative to the central section 44, respectively. FIG. 7B shows the first section 28 in the stowed position and the second section 84 in the fully-deployed position. FIG. 7D shows the first section 28 in the fully-deployed position and the second section 84 in the stowed position. The stowed position of the given section of the work surface 24 (e.g., the first section 28 and/or the second section 84) can arrange the given section in a generally parallel relationship with the central section 44. The generally parallel relationship between the given section and the central section 44 can arrange the underside 120 of the given section being in an abutting, or nearly-abutting, relationship with the underside 120 of the central section 44.

Referring again to FIGS. 7A-7D, in some examples, the first section 28 and the second section 84 may be capable of use as support legs for the central section 44 when the first section 28 and the second section 84 are each in the partially-deployed position. In such an arrangement, the distal edge 36 of the first section 28 and the distal edge 96 of the second section 84 can contact a surface below the work surface 24 such that the work surface 24 is suspended above the surface (e.g., the ground, the access panel 72 of the vehicle 20, a floor, etc.). Similarly, the work surface 24 may be used as a desk by a user placing the first section 28 on a first side of their legs and the second section 84 on a second side of their legs while the first and second sections 28, 84 are each in the partially-deployed position and the user is in a seated position. In such an arrangement, the post 60 of the first lock assembly 56 and/or a post 208 of the second lock assembly 104 may be placed in an extended-and-locked position (see FIG. 12). In some examples, the top side 132 of the work surface 24 may define one or more depressions 212. The one or more depressions 212 may aid in retaining items that are placed on the top side 132 while the work surface 24 is in use (e.g., writing utensils, electronic devices, beverage containers, and so on). In various examples, one or more of the one or more depression 212 may extend between the first section 28, the central section 44, and/or the second section 84 such that the given depression 212 includes a portion that is on the central section 44 and a portion that is on the given section (e.g., the first section 28 and/or the second section 84).

Referring to FIGS. 8-12, in various examples the hinge(s) 116 include a first portion 216 and a second portion 220. In the depicted examples, the first and second portions 216, 220 of the hinge(s) 116 each include a first leg 224 and a second leg 228. The first leg 224 of the hinge(s) 116 engages with the underside 120 of the work surface 24 (e.g., at the first section 28, the central section 44, or the second section 84). The second leg 228 of the hinge(s) 116 extend at an angle from the first leg 224 (e.g., a ninety degree angle) and engage with, for example, the proximal edge 32 of the first section 28, the first end 48 of the central section 44, the second end 52 of the central section 44, or the proximal edge 92 of the second section 84. When the first section 28 or the second section 84 are in the fully-deployed position, their corresponding second legs 228 of their hinges 116 may directly abut the immediately adjacent second leg 228 of the hinge 116 of the central section 44. The first and second portions 216, 220 of the hinge(s) 116 can be provided with radiused corners 232 that can enable smooth movement through the full range of motion of the first section 28 and/or the second section 84.

Referring again to FIGS. 8-12, the first lock assembly 56 includes a biasing member 236. The biasing member 236 biases the post 60 to the extended position. In various examples, the biasing member 236 can be a spring (e.g., a coil spring). A protrusion 240 extends from the post 60 of the first lock assembly 56. The protrusion 240 can be integrally formed or unitarily formed with the post 60. A user interacts with the protrusion 240 to transition the post 60 between the extended position and the retracted position. The protrusion 240 can be provided with a surface that is modified to increase a coefficient of friction between the surface of the protrusion 240 and the user (e.g., a finger of the user). For example, the surface modification to the protrusion 240 may be knurling or projections 244. The protrusion 240 may be provided with a flange 248 that may aid a user in transitioning the post 60 between the extended position and the retracted position. The flange 248 may aid in rotating the post 60 into and/or out of one or more receptacles.

Referring further to FIGS. 8-12, the central section 44 can define a first receptacle 252 and a second receptacle 256. The first receptacle 252 corresponds with the retracted position of the post 60 and the second receptacle 256 corresponds with the extended position of the post 60. The protrusion 240 is configured to be received within, or engage with, the first receptacle 252 when the post 60 is in the retracted position. The engagement between the protrusion 240 and the first receptacle 252 retains the post 60 in the retracted position. Physical interference between the protrusion 240 and the first receptacle 252 can resist the biasing force provided by the biasing member 236 when the post 60 is in the retracted position. When the post 60 is in the retracted position and the protrusion 240 is positioned within the first receptacle 252, the first lock assembly 56 may be referred to as being in a retracted-and-locked position. The protrusion 240 is configured to be received within, or engage with, the second receptacle 256 when the post is in the extended position. When the post 60 is in the extended position, the biasing member 236 may not be fully extended such that the biasing force remains present. Accordingly, as with the first receptacle 252, physical interference between the protrusion 240 and the second receptacle 256 can resist the biasing force provided by the biasing member 236 when the post 60 is in the extended position. It is contemplated that, in some examples, the biasing force provided by the biasing member 236 may reverse when the post 60 is in the extended position. That is, when the biasing member 236 is in the retracted position, the biasing member 236 may provide a biasing force that pushes the post 60 toward the channel 40. However, in some examples, when the biasing member 236 is in the extended position, the biasing member 236 may provide a biasing force that pulls the post 60 away from the channel 40.

Referring still further to FIGS. 8-12, the central section 44 can include a first protuberance 260 that is positioned adjacent to the first receptacle 252 and a second protuberance 264 that is positioned adjacent to the second receptacle 256. The first protuberance 260 can aid in "catching" the protrusion 240 as the post 60 is actuated to the extended position, thereby preventing over-extension of the post 60. Similarly, the second protuberance 264 can aid in "catching" the protrusion 240 as the post is actuated to the retracted position. Accordingly, the first and second protuberances 260, 264 can act as catches that are capable of guiding the protrusion 240 into the first and second receptacles 252, 256, respectively. In various examples, the first protuberance 260 is unitarily formed or integrally formed with a wall that at least partially defines the first receptacle 252. Similarly, in various examples, the second protuberance 264 is unitarily formed or integrally formed with a wall that at least partially defines the second receptacle 256. The post 60 is received within a passage 268 that is defined by the central section 44. The post 60 travels within the passage 268 as the post 60 is moved between the retracted position and the extended position. A back wall 272 of the passage 268 may be provided with a tab 276 extending therefrom. The tab 276 may be configured to be received by the biasing member 236. Accordingly, the tab 276 may provide a degree of retention to the biasing member 236 that can aid in maintaining an alignment of the biasing member 236 within the passage 268. For example, when the biasing member 236 is a coil spring, the tab 276 may be received within an inner diameter of the coil spring. A fully-deployed-and-locked position of the first section 28 may be defined as the post 60 of the first lock assembly 56 extending into the channel 40 that is defined by the first section 28 when the first section 28 is in the fully-deployed position.

Referring yet again to FIGS. 8-12, the second lock assembly 104 is comparable to the first lock assembly 56, with the second lock assembly 104 generally representing a mirror-image of the first lock assembly 56 due to the positioning of the second lock assembly 104 at the second end 52 of the central section 44. Accordingly, the foregoing descriptions equally apply to the second lock assembly 104, the second end 52 of the central section 44, and the second section 84. For the sake of brevity, the foregoing descriptions will not be outlined for the second lock assembly 104 in their entirety, as one of skill in the art will recognize corresponding structures. Rather, the second lock assembly 104 will be discussed generally. As mentioned above, the second section 84 defines the channel 100 therein. The second lock assembly 104 is coupled to the central section 44 and includes the post 208 that is operable between the retracted position and the extended position. Descriptions of the post 60 above apply in whole, or in part, to the post 208. The fully-deployed position of the second section 84 arranges the channel 100 defined by the second section 84 to receive the post 208 of the second lock assembly 104. As with the first lock assembly 56, a fully-deployed-and-locked position of the second section 84 can be defined as the post 208 of the second lock assembly 104 extending into the channel 100 defined by the second section 84 when the second section 84 is in the fully-deployed position. The biasing member 236 of the second lock assembly 104 can engage with the tab 276 within the passage 268.

Figure 12:
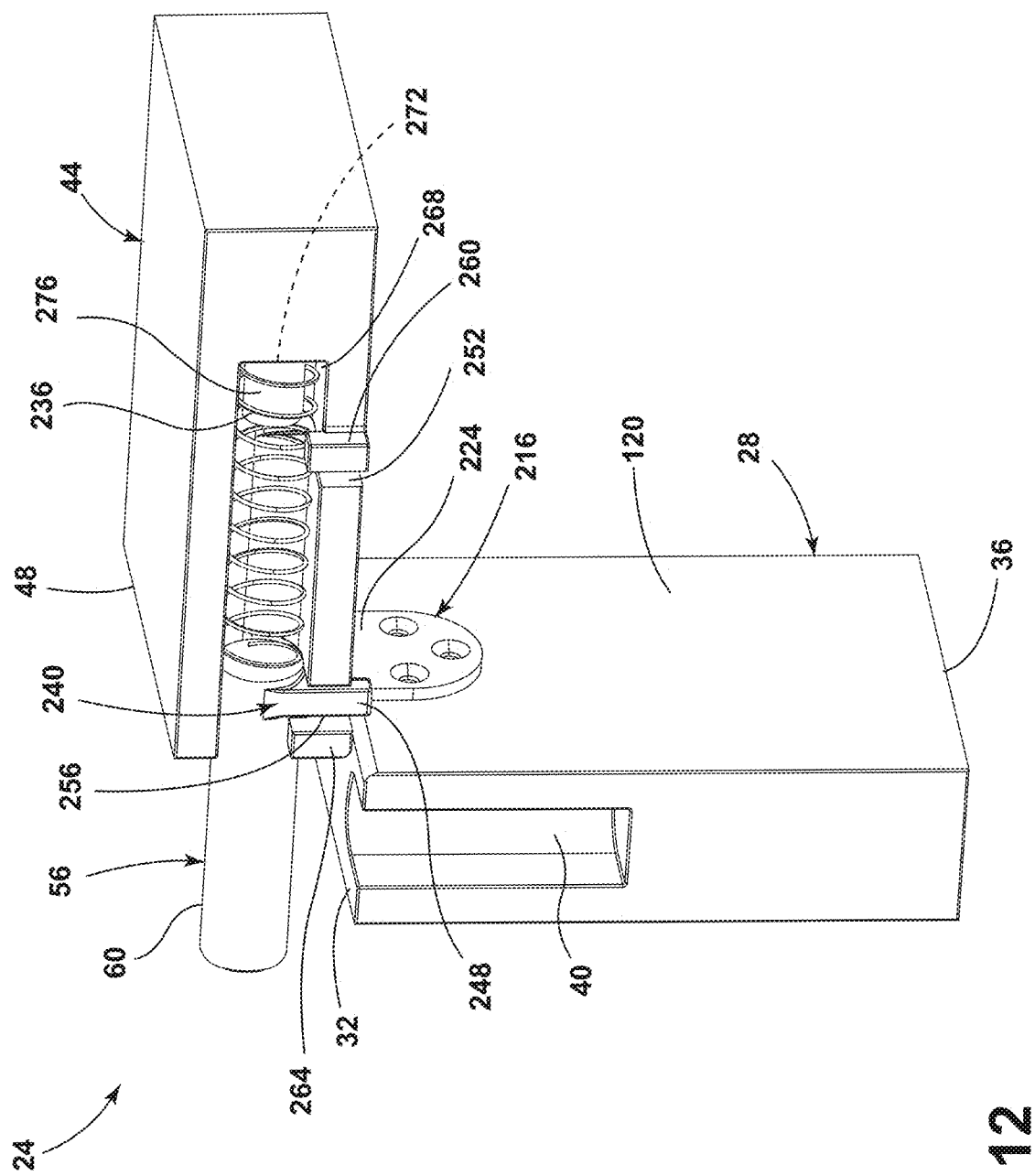
FIG. 12 is a side perspective view of the junction between the first section and the central section, illustrating the first section in the partially-deployed position and the post in the extended position, according to one example.

Referring to FIG. 12, the first and second lock assemblies 56, 104 are each capable of being placed in the extended position while the first and second sections 28, 84, respectively, are in the partially-deployed position as depicted. Such an arrangement may be referred to as a partially-deployed-and-extended position. In so doing, the post 60 of the first lock assembly 56 can aid in retaining the first section 28 in the partially-deployed position. For example, the post 60 may prevent the first section 28 from being rotated from the partially-deployed position to the fully-deployed position. Similarly, the post 208 of the second lock assembly 104 can aid in retaining the second section 84 in the partially-deployed position. For example, the post 208 may prevent the second section 84 from being rotated from the partially-deployed position to the fully-deployed position. The posts 60, 208 may not prevent the first section 28 and the second section 84, respectively, from rotating from the partially-deployed position to the stowed position. The partially-deployed-and-extended positions for the first and second sections 28, 84 can provide an additional use for the work surface 24 as a tray table, standalone table, mobile desk, and the like without employing the leg(s) 144.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:
1. A work surface for a vehicle, comprising:
a first section having a proximal edge and a distal edge, wherein the first section defines a channel therein;
a central section having a first end and a second end, wherein the first end of the central section is positioned adjacent to the proximal edge of the first section, wherein the proximal edge of the first section is pivotably coupled to the first end of the central section, wherein the first section is movable between a stowed position and a fully-deployed position relative to the central section;
a first lock assembly coupled to the central section, wherein the first lock assembly comprises a post that is operable between a retracted position and an extended position, wherein the fully-deployed position of the first section arranges the channel defined by the first section to receive the post of the first lock assembly, wherein the first lock assembly further comprises a biasing member positioned between the post and the central section, wherein the biasing member biases the post to the extended position, and wherein the first lock assembly further comprises a protrusion that extends from the post;
a first receptacle defined by the central section, wherein the protrusion is configured to engage with the first receptacle when the post is in the retracted position, and wherein the engagement between the protrusion and the first receptacle retains the post in the retracted position; and a second receptacle defined by the central section, wherein the protrusion is configured to engage with the second receptacle when the post is in the extended position, and wherein the engagement between the protrusion and the second receptacle retains the post in the extended position.

2. The work surface for a vehicle of claim 1, wherein a fully-deployed-and-locked position of the first section is defined as the post of the first lock assembly extending into the channel defined by the first section when the first section is in the fully-deployed position.

3. The work surface for a vehicle of claim 1, further comprising:
a second section having a proximal edge and a distal edge, wherein the proximal edge of the second section is positioned adjacent to the second end of the central section.

4. The work surface for a vehicle of claim 3, wherein the central section is positioned between the first section and the second section.

5. The work surface for a vehicle of claim 3, wherein the second section is pivotably coupled to the second end of the central section.

6. The work surface for a vehicle of claim 5, wherein the second section is movable between a stowed position and a fully-deployed position relative to the central section.

7. The work surface for a vehicle of claim 6, wherein the second section defines a channel therein.

8. The work surface for a vehicle of claim 7, further comprising:
a second lock assembly coupled to the central section, wherein the second lock assembly comprises a post that is operable between a retracted position and an extended position, wherein the fully-deployed position of the second section arranges the channel defined by the second section to receive the post of the second lock assembly.

9. The work surface for a vehicle of claim 8, wherein a fully-deployed-and-locked position of the second section is defined as the post of the second lock assembly extending into the channel defined by the second section when the second section is in the fully-deployed position.

10. The work surface for a vehicle of claim 3, wherein the first section and the second section are capable of use as support legs for the central section when the first section and the second section are each in a partially-deployed position.

11. The work surface for a vehicle of claim 10, further comprising:
a second lock assembly coupled to the central section, wherein the second lock assembly comprises a post that is operable between a retracted position and an extended position, wherein placing the post of the first lock assembly in the extended position when the first section is in the partially-deployed position and placing the post of the second lock assembly in the extended position when the second section is in the partially-deployed position aids in retaining the first section and the second section in the partially-deployed position.

12. The work surface for a vehicle of claim 1, further comprising:
a recess defined in an underside thereof.

13. The work surface for a vehicle of claim 12, further comprising:

a leg that is received by the recess, wherein the leg is configured to provide support to the work surface.

14. A work surface for a vehicle, comprising:
a first section having a proximal edge and a distal edge, wherein the first section defines a channel therein;
a second section having a proximal edge and a distal edge, wherein the second section defines a channel therein;
a central section having a first end and a second end, wherein the central section is positioned between the first section and the second section, wherein the first end of the central section is positioned adjacent to the proximal edge of the first section, wherein the proximal edge of the first section is pivotably coupled to the first end of the central section, wherein the first section is movable between a stowed position and a fully-deployed position relative to the central section, wherein the proximal edge of the second section is positioned adjacent to the second end of the central section, wherein the second section is pivotably coupled to the second end of the central section, wherein the second section is movable between a stowed position and a fully-deployed position relative to the central section;
a first lock assembly coupled to the central section, wherein the first lock assembly comprises a post that is operable between a retracted position and an extended position, wherein the fully-deployed position of the first section arranges the channel defined by the first section to receive the post of the first lock assembly; and
a second lock assembly coupled to the central section, wherein the second lock assembly comprises a post that is operable between a retracted position and an extended position, wherein the fully-deployed position of the second section arranges the channel defined by the second section to receive the post of the second lock assembly, wherein the first and second lock assemblies each further comprises:
a biasing member positioned between the post and the central section, wherein the biasing member biases the post to the extended position;
a protrusion that extends from the post;
a first receptacle defined by the central section, wherein the protrusion is configured to engage with the first receptacle when the post is in the retracted position, and wherein the engagement between the protrusion and the first receptacle retains the post in the retracted position; and
a second receptacle defined by the central section, wherein the protrusion is configured to engage with the second receptacle when the post is in the extended position, and wherein the engagement between the protrusion and the second receptacle retains the post in the extended position.

15. The work surface for a vehicle of claim 14, wherein a fully-deployed-and-locked position of the first section is defined as the post of the first lock assembly extending into the channel defined by the first section when the first section is in the fully-deployed position, and wherein a fully-deployed-and-locked position of the second section is defined as the post of the second lock assembly extending into the channel defined by the second section when the second section is in the fully-deployed position.

16. The work surface for a vehicle of claim 14, further comprising:
a recess defined in an underside thereof; and a leg that is received by the recess, wherein the leg is configured to provide support to the work surface.

\* \* \* \* \*